United States Patent [19]
Gerdt

[11] Patent Number: 5,136,669
[45] Date of Patent: Aug. 4, 1992

[54] VARIABLE RATIO FIBER OPTIC COUPLER OPTICAL SIGNAL PROCESSING ELEMENT

[75] Inventor: David W. Gerdt, Charlottesville, Va.

[73] Assignee: Sperry Marine Inc., Charlottesville, Va.

[21] Appl. No.: 670,549

[22] Filed: Mar. 15, 1991

[51] Int. Cl.$^5$ ................................................ G02B 6/26
[52] U.S. Cl. ........................................ 385/39; 385/27; 385/42; 385/48
[58] Field of Search ............... 350/96.12, 96.13, 96.14, 350/96.15, 96.16; 250/227.14; 385/24, 27, 31, 39, 42, 43, 46, 48, 50, 122, 141

[56] References Cited

U.S. PATENT DOCUMENTS

| | | |
|---|---|---|
| 4,634,858 | 1/1987 | Gerdt et al. .................... 250/227.14 |
| 4,693,547 | 9/1987 | Soref et al. ........................ 350/96.13 |
| 4,805,975 | 2/1989 | Utaka et al. ....................... 350/96.13 |
| 4,828,362 | 5/1989 | Skinner et al. ................. 350/96.15 X |
| 4,839,898 | 6/1989 | Payne et al. .................. 350/96.15 X |
| 4,874,216 | 10/1989 | Utaka et al. .................. 350/96.13 X |
| 4,900,134 | 2/1990 | Inoue et al. ................... 350/96.13 X |
| 5,016,957 | 5/1991 | Seaver .............................. 350/96.13 |

*Primary Examiner*—John D. Lee
*Attorney, Agent, or Firm*—Seymour Levine; Albert B. Cooper

[57] ABSTRACT

The coupler includes a waist region formed by merging and fusing a plurality of optical fibers with the waist region encapsulated in photorefractive encapsulating material. The index of refraction of the encapsulating material is modulated by applying illumination thereto, so as to vary the coupler output ratio. The applied illumination can direct the coupler output from one output fiber to another output fiber thereby providing an optically actuated switch. The illumination applied to the encapsulating material can direct a large optical power signal applied to an input fiber from one output fiber to another output fiber thereby providing an optical amplifier analogous to a transistor. One of the output fibers of the element can be utilized to provide the encapsulating material illumination thereby providing an optical feedback oscillator. Bias illumination applied to the encapsulating material results in a narrow band of a broadband input optical signal to be directed to an output fiber thereby providing an externally tuned spectrometer or optically tuned wavelength division demultiplexer. An input optical signal can correlate with the illumination applied to the encapsulating material to provide an optical correlator. In an element with encapsulating material that is both photoelastic and photorefractive, or both bend sensitive and photorefractive, the photorefractive effect can be utilized to bias the device to a predetermined point on the operating curve irrespective of applied stress. Networks of the optical signal processing elements can be interconnected to provide computing systems.

10 Claims, 5 Drawing Sheets

VARIABLE RATIO FIBER OPTIC COUPLER OPTICAL SIGNAL PROCESSING ELEMENT

BACKGROUND OF THE INVENTION

1. Field of the Invention

The invention relates to optical signal processing including, but not limited to, switching, amplification, correlation, combinational logic and algorithmic processing, optical wavelength discrimination, optical signal generation, and optical compensation. Such signal processing is preferably performed solely within the optical domain.

2. Description of the Prior Art

Present day optical signal processing is performed by a diverse variety of elements specifically dedicated to the functions to be performed and spanning a wide range of design concepts and technologies.

Optical amplifiers for fiber optic systems have been constructed utilizing Erbium-doped fiber that is optically pumped by semiconductor diode lasers. Information signal pulses passing through an optically pumped, Erbium-doped region, cause stimulated emission adding photons to the pulses resulting in optical amplification thereof. Other known technologies for providing optical amplification comprise the semiconductor laser amplifier (SLA) and the Raman amplifier. The SLA is exemplified by the Fabry-Perot SLA or the traveling-wave SLA. The described optical amplifiers function because an electronic population is inverted in a material such as glass or semiconductor. The Fabry-Perot SLA inverts the population inside a semiconductor by an electrical field.

Although the Erbium amplifier is in present day use for long-haul fiber optic communication systems, the amplifier tends to be very expensive. The Fabry-Perot SLA is also extremely expensive, on the order of $20,000.00 each in limited production quantities. The Fabry-Perot SLA is not an all-optical device, which may limit the use thereof in remote locations. The prior art optical amplifiers described may also be bandwidth limited because of the finite time required for the system to repopulate for the next arriving pulse. In such amplifiers, the light is propagated without the possibility of conversion, such as frequency conversion, or deflection from one path to another. In such amplifiers the light signal remains in its original path. Such amplifiers are like pipelines where optical signals pass from one waveguide to another without conversion or bending. The optical signals are amplified within the amplifier waveguide. The traveling-wave SLA and the Raman amplifier are of theoretical interest and have not enjoyed widespread commercial usage. This is because of manufacturing difficulties and optical losses associated with transfer of the optical power to the waveguide and then back to a fiber. Other difficulties are associated with attaining sufficient gain in the amplifier cavity while suffering attenuation therein.

In present day fiber optic systems, mechanically actuated optical switches are primarily utilized. Such mechanical switches function by movement of a directing mirror through activation by a solenoid and tend to have short operational lifetimes because of mechanical wear-out through repeated switching. Magneto-optical and electro-optical switching are also known, although not in widespread usage. Electro-optical switches of many types have been demonstrated as integrated optical devices. Waveguide loss in the integrated optics devices remains high. It is difficult to get light into integrated optical devices without appreciable loss of signal strength. Magnetic or electrical fields generated by electrical voltages and currents provide the light switching actuation. Since such switches are not all optical, usage thereof at remote locations may be limited. In addition, the electrical voltages and currents tend to generate electronic and magnetic interference and noise in adjacent equipment. Such switches also tend to be less reliable than all-optical devices because of potential failures in the electrical and magnetic driving circuits and equipment.

Optical signal computation and processing presently remains an unfulfilled objective. Optical signal processing is desirable because of the significantly greater speeds potentially available from optical devices and because of the relatively low power consumption required thereby. An all-fiber optical processor would be desirable because of the facility with which optical signals are transported through optical fibers. Such processors may perform functions including power spectrum decomposition, matrix inversion, Eigenvalue solutions, weighted sums and other digital algorithmic functions. Presently, optical computing has only been demonstrated in bulk optical forms such as acoustic signal processors, spatial light modulators, and integrated optics devices. The difficulty of using bulk optical components are requirements of a vibration free table, complex optical alignments, large system loss, and difficulties in coupling light into bulk devices. Spatial light modulators are lossy and require spatial division and transfer of many separate optical beams. They are generally slow and require optical tables, benches, and the like. Integrated optical devices have fairly high loss and are, presently, difficult to mass produce. Fiber attaches to the input of integrated optical devices with high loss due to mismatch of modal light fields, Fresnel reflection, and temperature induced instabilities due to thermal coefficient of expansion mismatch. All of these devices may be attached or strung together with fiber but tend to be lossy. It is believed that substantially no all-fiber optical processors have been demonstrated to date.

In an unrelated technology, the variable ratio fiber optic coupler sensor is known and described in U.S. Pat. No. 4,634,858, issued Jan. 6, 1987, entitled "Variable Coupler Fiberoptic Sensor" by Gerdt et al. Said U.S. Pat. No. 4,634,858 is incorporated herein by reference. Said U.S. Pat. No. 4,634,858 describes the sensor as a device that varies the output coupling ratio in accordance with stress induced in a photoelastic encapsulating material. The index of refraction of the encapsulating material is described as varying with stress applied thereto, and the output coupling ratio of the sensor is described, in the patent and elsewhere, as a highly sensitive function of the index of refraction. The sensor is utilized to sense acoustic, electric, magnetic and mechanical fields. Any mechanism that converts a physical or field effect into a force that applies stress to the encapsulating material may be sensed by the device. The fiber optic coupler sensor may be considered as an optical strain gauge, whereby strain resulting from a parameter to be measured results in a modulation or change in the coupling output ratio of the coupler sensor in accordance with the magnitude of the parameter to be measured. Parameters which do not generate strain cannot be sensed by a strain gauge, whether optical or based on a non-optical technology. Thus, variations in light intensity that do not result in stress applied to the encapsulating material are not sensed by the device. It is believed that these devices can transfer power between output fibers because of bending which occurs in the fused waist region.

SUMMARY OF THE INVENTION

By a modification to the variable ratio fiber optic coupler sensor described in said U.S. Pat. No. 4,634,858, a basic optical signal processing element is created that forms the basis for far-reaching applications in implementing the optical signal processing technologies described above. This new optical signal processing element is created by utilizing a photorefractive material as the coupler encapsulation so that illumination incident thereon alters the index of refraction thereof to vary the output coupling ratio of the device.

Specifically, the invention is a fiber optic coupler optical signal processing element comprising a plurality of input optical fibers each having a core, the cores of the optical fibers being merged and fused in a waist region to form a common optical core wherefrom a plurality of output optical fibers emerge. The coupler distributes an input optical signal incident to one of the input optical fibers between the plurality of output optical fibers. Encapsulating material having a refractive index variable with illumination incident thereon, encapsulates the waist region such that the input optical signal applied to the input optical fiber is distributed between the plurality of output optical fibers as a function of the illumination incident on the encapsulating material.

DESCRIPTION OF THE PREFERRED EMBODIMENTS

Figure 1:
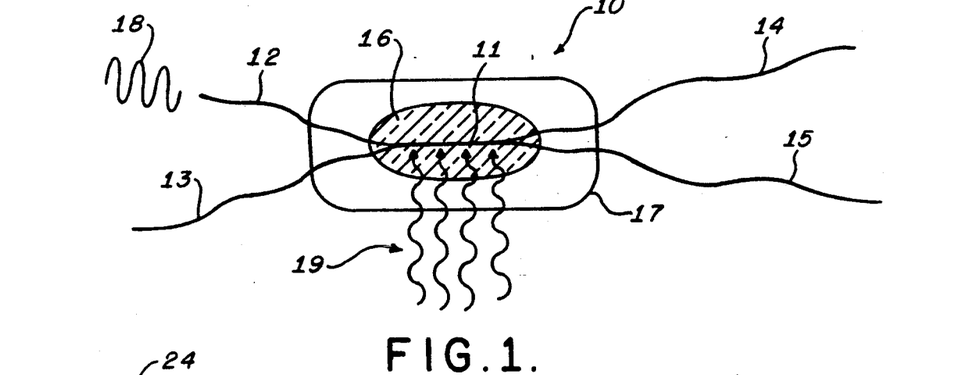
FIG. 1 is a schematic diagram of a light signal processing element implemented in accordance with the present invention utilizing the variable ratio fiber optic coupler.

Referring to FIG. 1, a generic optical signal processing element 10, implemented in accordance with the present invention, is illustrated. The element 10 is based on the variable ratio fiber optic coupler described in said U.S. Pat. No. 4,634,858. Two or more optical fibers having cores and cladding are merged and fused to form a waist region or coupling fusion joint 11. The merged and fused fibers, therefore, form input fibers 12 and 13 to the coupler 10 and output fibers 14 and 15 from the coupler 10. The coupling joint 11 is encapsulated in an encapsulating material 16 having photorefractive properties. The encapsulating material 16 containing the coupling joint 11 is formed in an element housing 17.

An input light signal 18 applied to the input fiber 12 is coupled to the output fibers 14 and 15 in a ratio in accordance with the index of refraction of the material 16 surrounding the joint 11. The input fiber 13 is unused. The index of refraction of the encapsulating material 16 varies in accordance with externally applied optical illumination 19 incident thereon. Thus, the output coupling ratio of the element 10 is controlled by the illumination 19. By appropriately merging, fusing and drawing the joint 11, as is known in the art, and selecting the index of refraction of the material 16, substantially all of the light energy 18 can be coupled to the output fiber 15 when external illumination 19 has a predetermined low level such as zero amplitude. When illumination 19 has a predetermined high level, substantially all of the light energy 18 can be coupled to the output fiber 14. With intermediate levels of the illumination 19, the light energy 18 is coupled to the output fibers 14 and 15 in accordance with the coupling ratio controlled by the index of refraction of the material 16. It is expected, in practical devices, that the limiting coupling ratios will be approximately 99%:1% and 1%:99%.

The output ratio of the coupler element 10 is extremely sensitive to changes in the refractive index of the encapsulating material 16. Many photorefractive materials exist that change the refractive index thereof in proportion to the amount of optical energy incident thereon. The encapsulating material 16 may be partially or completely comprised of photorefractive materials in a manner to be described. Materials suitable for use as the encapsulating material 16 comprise organic dyes, organic semiconductors such as Tetrcreyanodequiono methane (TCNQ), and certain optically active liquid crystals. Thus, there are a substantial number of materials suitable for use as the encapsulating material 16. The identification of photorefractive materials is presently an active pursuit. Many laboratories are seeking these materials and many more are becoming known.

The refractive index of most materials may be reversibly altered by high intensity light. In the discipline of nonlinear optics, the third order nonlinearity $X^{(3)}$ is responsible for refractive index changes. The refractive index change, $\Delta n$, in a photorefractive material is given by $$\Delta n = n^3 rE/2$$

where n is the background index, r is the electro-optic coefficient and E is the space charge field. In liquid crystal spatial light modulators, a change of $\Delta n = 0.1$ is attained using an energy equivalent of 100 $\mu W/cm^2$ at 10 msec rise time (1 μJ/cm²). This is explained in more detail in P. Gunther, Phys. Rep. 93, 199 (1982). This index of refraction change at such light levels significantly exceeds that required for the present invention.

Third order nonlinearity has been observed in several classes of conjugated organic materials such as molecular fluids, conjugated polymers and liquid-crystalline polymers. There are no symmetry restrictions on third-order non-linear processes and, therefore, amorphous materials may be used. See: R. A. Hann and D. Bloor, "Organic Materials for Non-linear Optics", Special Publication No. 69, Royal Society of Chemistry, Whitstable Litho Printers Ltd., Kent, 1989. In ferroelectric oxides, the lattice vibration frequencies are on the order of 1 to 10 THz and a nonlinear optical response could be expected in the 0.1 to 1 psec time interval. Subpicosecond response times have been observed in various materials. Organic semiconductors should provide large third order effects especially at the band edge. TCNQ, a charge transfer complex, is an example of such an organic semiconductor. Under appropriate illumination, most organic dyes experience large changes in molecular charge distribution. The refractive index is primarily a measure of the electronic charge distribution.

The electric field of an optical signal is not usually large compared to the electric fields existing in atoms and molecules. Lasers, however, generate optical fields with corresponding electric fields approaching or exceeding molecular electric fields Small optical fields can produce large resonant nonlinear polarizability and corresponding refractive index changes. Photorefractive materials with large nonlinearity effects are becoming increasingly available. For example, various organic polymers and liquids are presently available. In accordance with the microscopic theory of photorefraction, it is possible, in some instances, to engineer or design a molecule to exhibit a particular nonlinear optical property. Accordingly, as the theory develops, it should be possible to design the encapsulation medium 16 to optimize the properties of a particular coupler optical device.

Many of the known organic nonlinear optical polymers have refractive indices that are too large to be utilized as the encapsulating material 16. Most of these materials are, however, soluble in low index liquids, silicon rubbers or epoxies Mixing of a low index material with a high index material generally produces a material of intermediate index In the first approximation, the standard weighted rule of mixtures applies. In the diluted mixture, decreased nonlinear sensitivity may result. It is expected that this would not be detrimental to the operability of the device.

In a manner to be further described in detail, the externally applied illumination 19 may initiate substantially complete switching from one of the output fibers 14 or 15 to the other, may cause the optical signal 18 to divide between the two output fibers 14 and 15 in a ratio in accordance with the magnitude of the illumination 19, may itself contain a signal encoded as an amplitude variation and therefore may mix or correlate with the same signal impressed upon the coupler input fiber 12. In a manner to be explained hereinafter, numerous applications of the element are derived from the property of optically varying the coupling ratio by utilizing the photorefractive coupler encapsulation material 16.

Figure 2A:
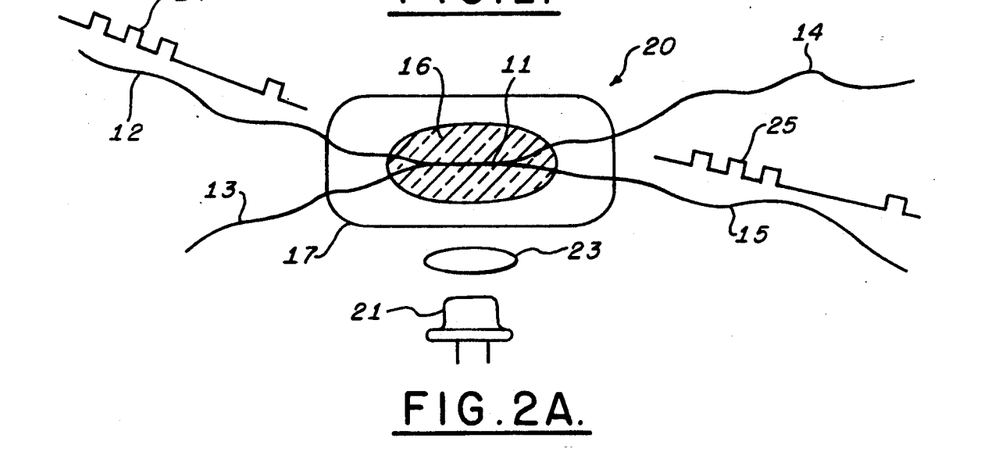
FIG. 2A and 2B are schematic diagrams of an optically actuated switch illustrated in each of two binary states, respectively, and implemented utilizing the element of FIG. 1.
Figure 2B:
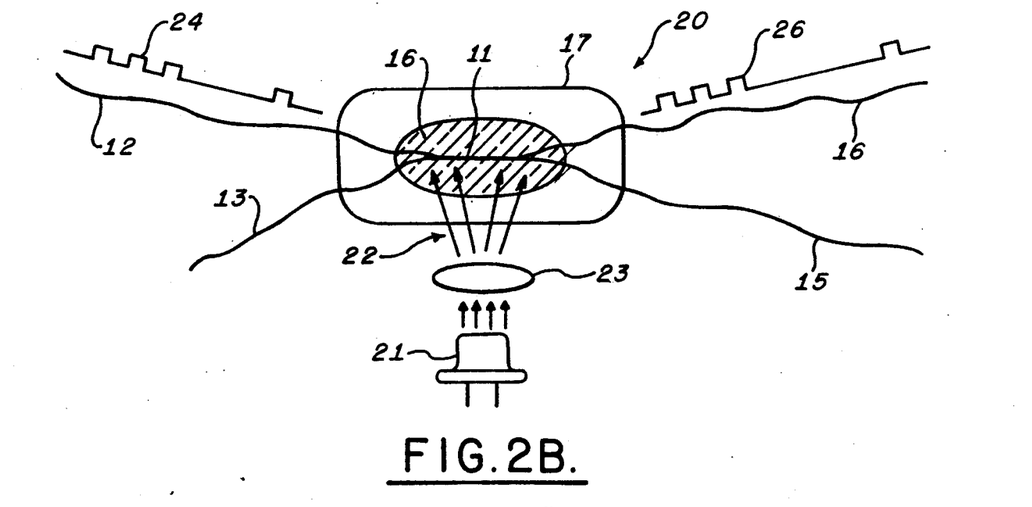

Referring to FIGS. 2A and 2B, in which like reference numerals indicate like elements with respect to FIG. 1, an optically actuated switch 20 implemented in accordance with the present invention is illustrated. A light source 21 provides controlling illumination 22 to the encapsulating material 16 surrounding the coupling joint 11. The light from the source 21 is focused and directed through a lens system 23. FIG. 2A illustrates the condition where the light source 21 does not provide any illumination to the coupling joint 11. FIG. 2B illustrates the situation where the light source 21 provides sufficient illumination to the coupling joint 11 to fully actuate the switch 20. In FIG. 2A, an input optical signal 24 applied to the input fiber 12 is directed to the output fiber 15 and is illustrated as output signal 25. When the light source 21 provides sufficient illumination to the photorefractive encapsulating material 16, as illustrated in FIG. 2B, the input signal 24 is switched to the output fiber 14 and is denoted as output signal 26. Specifically, the light intensity or optical field 22 provided by the light source 21 is utilized to vary the coupling ratio of the switch 20 from, for example, 99%:1% to 1%:99% thereby switching the optical signal 24 within the fibers between the output fibers 14 and 15.

It is not necessary that the source 21 of switching optical field be electrically connected near the optically actuated switch 20. The switching source may be remote from the switch. The actuating light may be transported to the switch 20 through an optical fiber and concentrated by the lens system 23 onto the encapsulating material 16 surrounding the coupling joint 11.

It is appreciated that the element 20 may be utilized as the basic binary state switching device for a fiber optical computing system. In such a device, an optical fiber would convey binary valued light signals to the lens 23 to provide the illumination 22. The binary valued light signals would be either on or off. When the input light signal is off, the state of the element is as illustrated in FIG. 2A. When the input light signal is on, the state of the element is as illustrated in FIG. 2B. Thus, in response to the binary level input light signal 22, the element 20 assumes one or the other of two binary states. The output fibers 14 and 15 would then provide the controlling illumination 22 for subsequent binary elements. Alternatively, the output fibers 14 and 15 can be utilized as input fibers 12 and/or 13 to subsequent logic elements. In this manner, combinational and arithmetic logic networks can be implemented utilizing optically actuated optical switches.

Figure 3:
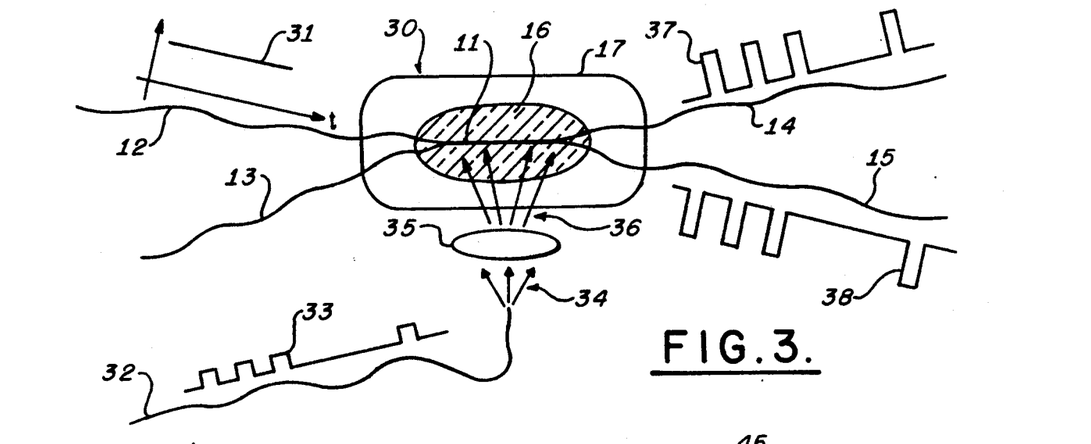
FIG. 3 is a schematic diagram of an optical amplifier implemented utilizing the element of FIG. 1.

Referring to FIG. 3, in which like reference numerals indicate like elements with respect to FIG. 1, an optical amplifier 30 implemented in accordance with the present invention is illustrated. The optical amplifier 30 is sourced by a large, constant and continuous power level optical signal 31 applied to input channel 12. Quiescently, the coupler amplifier 30 transmits the signal 31 to the output channel 15. The input signal 33 to be amplified is applied to a signal input fiber 32 and may, for example, comprise a train of small amplitude optical pulses. The input signal 33 is conveyed by the fiber 32 and light rays 34, containing the signal, diverge from the fiber 32. The light rays 34 impinge on a lens system 35 that focuses the weak input signal onto the area of the fusion joint 11. Reference numeral 36 represents the light rays from the lens system 35 containing the input signal and focused onto the area of the fusion joint 11.

The low amplitude pulses of the input signal 33 are sufficient to switch the coupling ratio so that substantially all of the power is diverted to the output channel 14 during the duration of the input pulse. For example, the low amplitude input pulses are sufficient to change the coupling ratio from 1%:99% to 99%:1%. During the input pulse time duration, large pulses of light are directed to the output channel 14 and an equivalent optical energy is diverted from the output channel 15. The output power of the output channel 15, except for the time duration of the weak illumination pulses, is constant and large Thus, the input signal 33 appears as an amplified signal 37 on output channel 14 and an unused power signal 38 also appears on output fiber 15. The signal 38 is the inverse of the signal 37.

The optical amplifier 30 may be considered analogous to a transistor amplifier. In the optical amplifier 30, the weak optical signal 33 is applied to an area or region analogous to the base of a transistor. This optical base permits and controls optical energy 31, analogous to current, to be switched from the input fiber 12, the equivalent of an emitter, to the output fiber 14, the equivalent of a collector. The reservoir of light 31 is switched off and on, or is propagated at an intermediate level, effectively following the pulse train 33 of the weak signal. Thus, in direct analogy to the transistor, a small signal 33 at the base of the transistor controls a large reservoir of current from the emitter to the collector. In the analogy, input fiber 12 is the emitter, output fiber 14 is the collector and the signal on the fiber 32 is the base signal. The weak pulses of the signal 33 must, however, be sufficiently strong to cause the required photorefractive effect. A similar analogy may be made between the optical switch 20 of FIGS. 2A and 2B and a transistor switch.

The optical devices described herein, in addition to performing functionality analogues to that of the transistor, provide additional features. The wavelength of the light from the reservoir 31 may be different from the wavelength of the light comprising the input signal 33. Thus, the device 30 in addition to amplifying the input optical signal 33, may also change the frequency thereof. For example, the wavelength of the light comprising the input pulses 33 may be 830 nm and the light comprising the output pulses 37 may be 1300 nm. To effect the frequency change, the wavelength of the reservoir light 31 is different from the wavelength of the optical input pulses 33.

In addition to the controlled frequency change, the optical amplifier 30 also provides an output signal and the inverse thereof. The inverse output signal is not generated in the transistor analogy.

Figure 4:
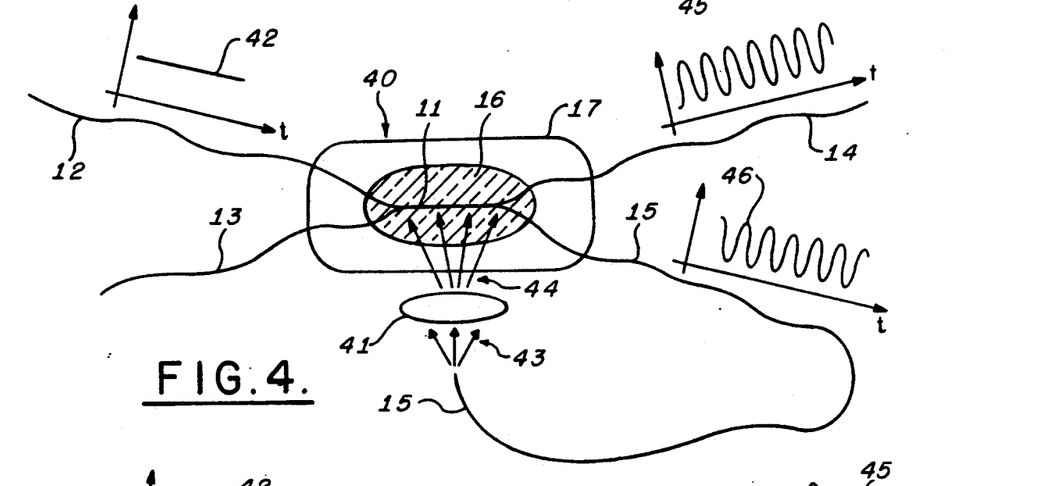
FIG. 4 is a schematic diagram of an optical feed-back oscillator implemented utilizing the element of FIG. 1.

Referring to FIG. 4, in which like reference numerals indicate like elements with respect to FIG. 1, an optical feedback oscillator 40 implemented in accordance with the present invention is illustrated. The optical oscillator 40 of FIG. 4 is similar to the optical amplifier 30 of FIG. 3, except that the optical signal on the output fiber 15 is fed back through a lens system 41 to illuminate the region of the coupler fusion joint 11. Since the output feedback fiber 15 provides positive feedback, the amplifier becomes an oscillator in the manner of a traditional positive feedback oscillator.

Specifically, an input light level signal 42, that is large in amplitude and constant in time, is applied as a source signal to the oscillator 40 through the input fiber 12. Quiescently, the signal 42 is directed through the coupling joint 11 to the output fiber 15 which is fed back to illuminate the photorefractive encapsulation region 16 surrounding the fusion joint 11. Light rays 43, diverging from the output fiber 15, are focused by the lens system 41 onto the fusion joint 11 to provide focused output fiber light 44. The input light level 42 provides feedback light 44 which varies the index of refraction of the encapsulation material 16 surrounding the coupler fusion joint 11. The amplitude of the input light level 42 is selected so that the feedback light 44 varies the coupling ratio to switch the light from the output fiber 15 to the output fiber 14. For example, the coupler output ratio may change from 1%:99% to 99%:1%. When the coupler light output has been sufficiently diverted from the output fiber 15 to the output fiber 14 so that the optical signal in output fiber 15 provides insufficient modulation of the index of refraction of the encapsulation material 16, the coupler reverts back to quiescence with the input light 42 again being directed to the output fiber 15. For example, the coupler may revert back to the 1%:99% ratio. This cycle repeats to provide an oscillator frequency output signal 45 on the output fiber 14 in the manner of a traditional feedback oscillator. The coupler feedback signal on the output fiber 15, denoted by reference numeral 46, is at the same frequency as the oscillator output signal 45, but out of phase therewith.

The length of the output fiber 15 determines the frequency of the optical feedback oscillator 40. The output feedback fiber 15 stores the large optical level 42 for a time dependent on the length thereof and the frequency of the oscillator 40 may be controlled by varying the length of fiber in the feedback path. A network of optically actuated switches (not shown) may provide various lengths of feedback fiber for use by the oscillator thereby constructing an optically tuned optical signal generator.

Figure 5:
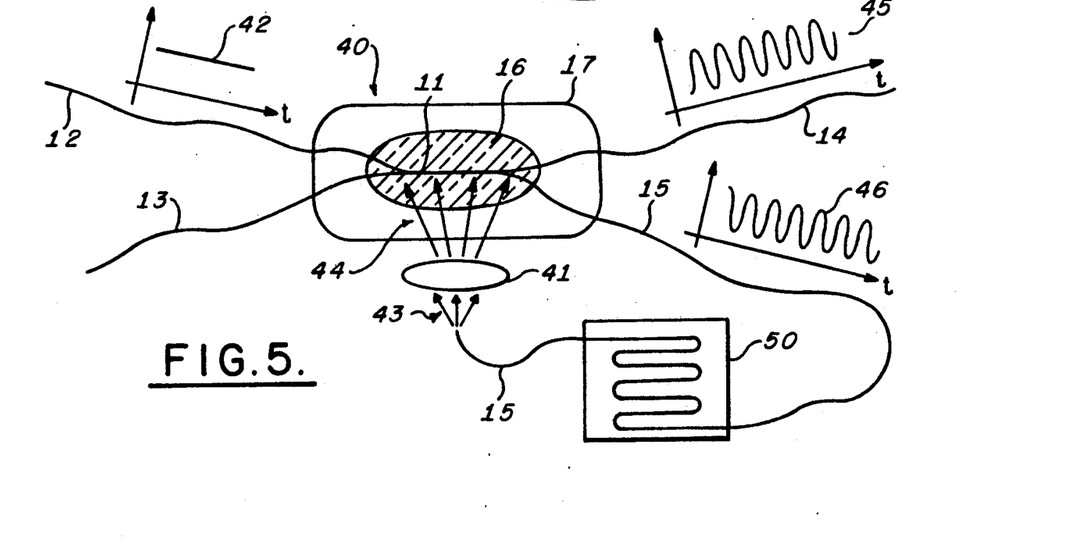
FIG. 5 is a schematic diagram of an optical strain gauge utilizing the optical feed-back oscillator of FIG. 4.

Referring to FIG. 5, in which like reference numerals indicate like elements with respect to FIG. 4, an optical strain gauge implemented in accordance with the present invention is illustrated. FIG. 5 is identical to FIG. 4 except that the feedback fiber 15 is constructed with a fiber length changing element 50 in the feedback loop. The element 50 changes the length of the fiber 15 in response to a parameter to be measured, thereby altering the frequency of the oscillator 40. The frequency of the oscillator output signal 45 then becomes a measure of the parameter. The element 50 is illustrated with the fiber 15 affixed thereto in serpentine fashion so as to measure strain in a member to which the element 50 is fastened. Alternatively, the fiber 15 may be wound around a member to detect dimensional changes thereof. In such applications, the output fiber 15 forming the feedback loop may be approximately 10 meters long to provide measurement sensitivity.

Figure 6:
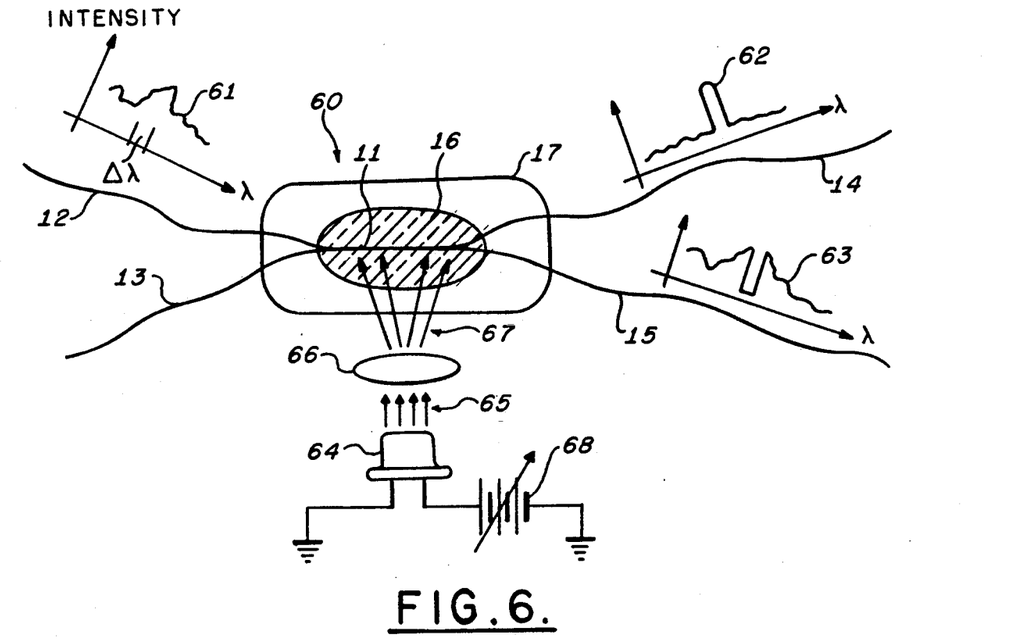
FIG. 6 is a schematic diagram of an externally tuned coupler spectrometer implemented utilizing the element of FIG. 1. The spectrometer illustrated, also functions as an optically tuned wavelength division demultiplexer.

Referring to FIG. 6, in which like reference numerals indicate like elements with respect to FIG. 1, an externally tuned coupler spectrometer 60 implemented in accordance with the present invention is illustrated. The spectrometer 60 also functions as an optically tuned wavelength division demultiplexer. The operation of the spectrometer 60 is predicated on the property of coupler wavelength sensitivity. The coupler output ratio for constant wavelength varies with the index of refraction of the encapsulating material surrounding the coupler joint. Similarly, the output ratio at constant refractive index varies with wavelength. A complex input signal 61 is applied on input channel 12. The input signal 61 is illustrated as a graph of input intensity vs. wavelength indicating the wavelength distribution at one instant in time. Each narrow band of wavelengths, $\Delta\lambda$, is considered a separate and independent information channel. The superposition of these narrow band channels, as illustrated by graph 61, is similar to the mixture of numerous television channels received, for example, in a cable television system. For a particular index of refraction 20 of the encapsulation material 16 surrounding the coupler fusion joint 11, a particular band, Δλ, is directed to output fiber 14 whereas the other wavelength bands are directed to output fiber 15. To change the wavelength band selected for application to the output fiber 14, the index of refraction of the encapsulating material 16 is changed by varying the illumination on the fusion joint 11. The selected wavelength band output is illustrated by graph 62 associated with the output fiber 14 and the output intensity vs. wavelength on the output fiber 15, with the selected wavelength band missing, is illustrated by a graph 63.

Wavelength band tuning is effected by an optical source 64 with light rays 65 diverging therefrom. A lens system 66 efficiently directs the light rays 65 to provide directed light rays 67 impinging on the fusion joint 11. A current tuning device 68 sets the appropriate illumination from the optical source 64 to select the predetermined wavelength band.

Specifically, selection of a band, Δλ, is effected by varying the refractive index of the encapsulating material 16 so that the coupler 60 provides a 99%:1% output ratio for the desired wavelength band, Δλ. Thus, the desired wavelength channel is directed to output fiber 14 as indicated by the graph 62. For the particular index of refraction set by the current tuning device 68, the coupler 60 provides, for example, a 1%:99% output ratio with respect to the non-selected bands or channels so that these signals are directed to output fiber 15. Since the refractive index of the photorefractive encapsulating material 16 surrounding the fusion joint 11 is intensity dependent, wavelength channel selection is effected by applying variable current levels to the optical source 64 via the current tuning device 68, thereby generating optical intensity 67 according to the level of current supplied.

Figure 7:
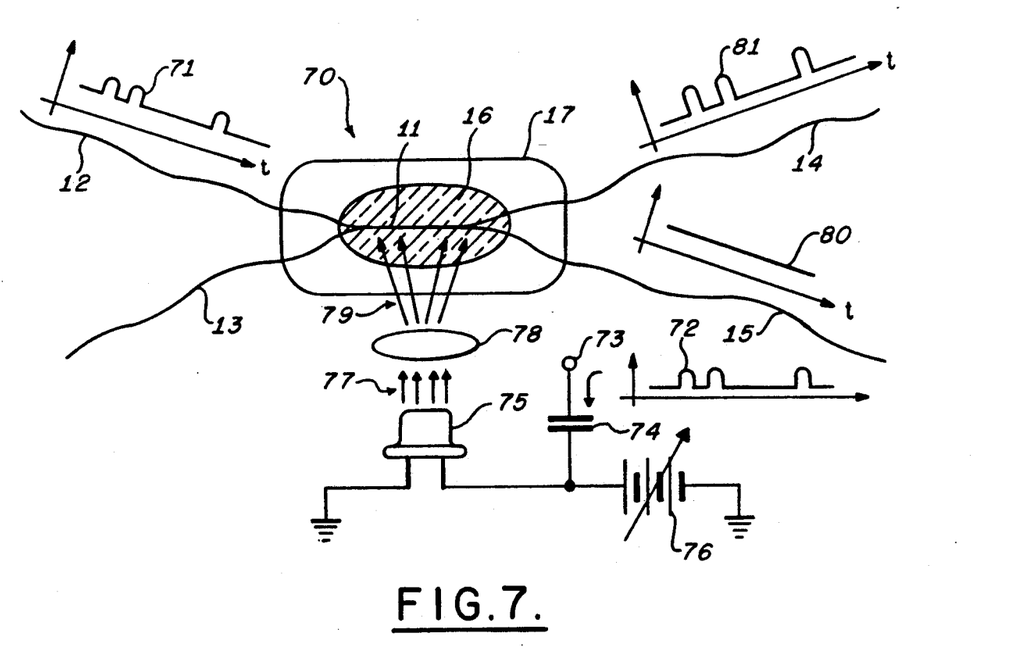
FIG. 7 is a schematic diagram of an optical correlator implemented utilizing the element of FIG. 1.

Referring to FIG. 7, in which like reference numerals indicate like elements with respect to FIG. 1, an optical correlator 70 implemented in accordance with the present invention is illustrated. An input signal pulse train 71 enters the correlator 70 on input fiber 12. The information contained in the series of pulses 71 is resident in the pulse pattern comprising the number of individual pulses and the separation thereof in time. The correlator 70 is utilized to correlate the incoming pulse train 71 with an identical pulse train correlation signal 72 generated from an information storage device or memory and applied to a terminal 73. The correlation signal 72 is applied through a D.C. blocking, signal input capacitor 74 to modulate the light output of an optical source 75. The modulated optical source 75 may be biased to a predetermined optical level by a bias current from a current bias source 76. Divergent light rays 77 from the source 75 are directed by a lens system 78. Light rays 79 directed by the lens system 78 impinge on the coupler joint 11.

As is well known in correlation technology, means (not shown) may be utilized to shift the waveform 72 in phase until the optical pulses from the waveform 71 are coincident at the fusion joint with the corresponding optical illumination pulses from the source 75. The optical bias controlled by the bias current source 76 is selected such that if an input signal pulse of the waveform 71 is not coincident with an illumination pulse from the source 75 resulting from the waveform 72, the signal pulse is directed to both output fibers 14 and 15.

An illumination pulse from the source 75 resulting from a correlation signal pulse 72, causes an instantaneous coupler ratio change sufficient to remove an input signal pulse from the channel 15 and direct an amplified version of the pulse to the channel 14. Thus, when an input signal pulse from the waveform 71 is coincident with a correlation illumination pulse from the waveform 72, the pulse is directed to the output fiber 14 and the output signal on the fiber 15 remains constant. If the correlation illumination pulse from the source 75 is not coincident with an input signal pulse from the waveform 71, the instantaneous coupler ratio change removes constant optical signal from the output fiber 15 and applies this signal to the output fiber 14.

Thus, it is appreciated that when input signal pulses from the waveform 71 are not coincident with correlation illumination pulses from the source 75, positive optical pulses appear on the output fiber 15. When correlation illumination pulses from the source 75 are not coincident with input pulses from the waveform 71, negative optical pulses appear on the output fiber 15. When input and correlation pulses are coincident at the fusion joint 11, a constant output signal 80, denoting correlation, appears on the output fiber 15. In a manner understood in correlation technology, the positive and negative pulses on the output fiber 15, denoting lack of correlation, can be utilized to shift the phase of the correlation signal 72 in the appropriate direction to effect correlation.

Specifically, assume that a replica 72 of the expected pulse train 71 is utilized to drive the light source 75 which, in turn, illuminates the photorefractive material 16 surrounding the coupler joint 11. Further, assume that the two waveforms are synchronized such that pulses from the signal 71 and counterpart pulses from the optical illumination 79 are coincident at the coupler fusion joint 11. Correlation is established when the signal pulses are removed from the output channel 15 because of the series of instantaneous coupler ratio changes effected by the illumination pulses from the source 75. The signal removed from the output channel 15 is directed to, and essentially amplified on, the remaining channel 14. Reference numeral 81 represents the amplified input signal on the output fiber 14.

Figure 8:
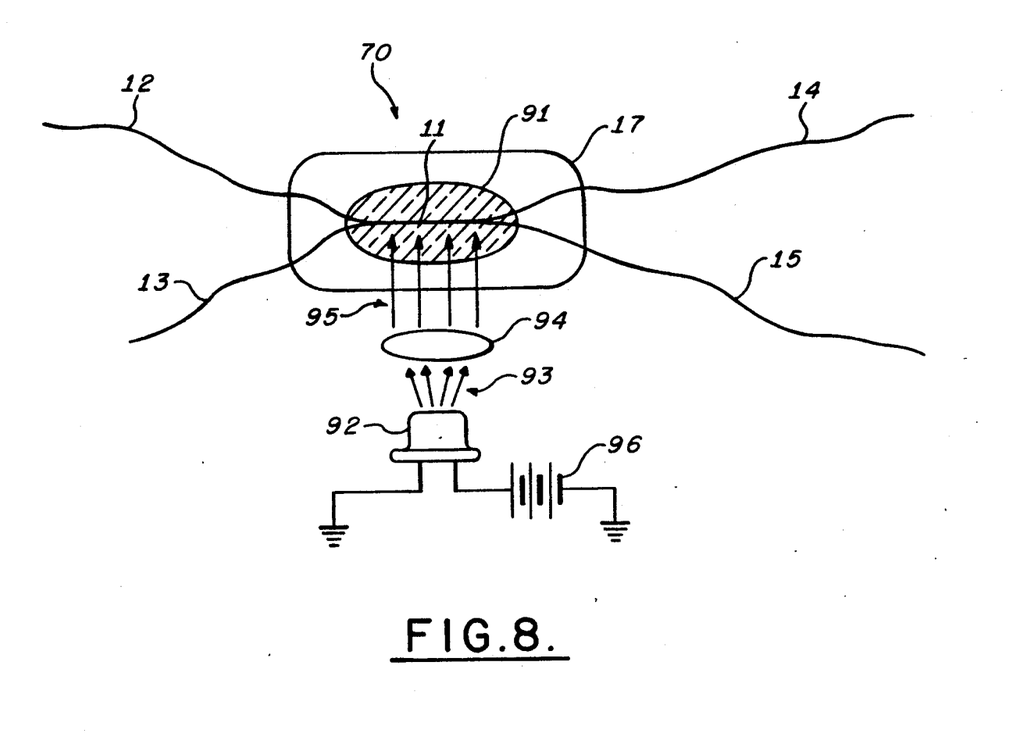
FIG. 8 is a schematic diagram of an optical compensator implemented utilizing the element of FIG. 1.
Figure 8A:
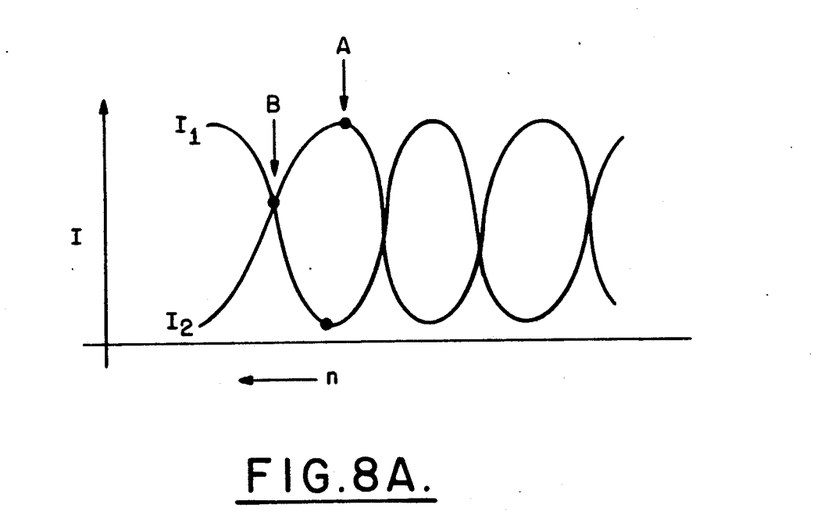
FIG. 8A is an operational diagram of the fiber optic coupler sensor of said U.S. Pat. No. 4,634,858.

Referring to FIG. 8, in which like reference numerals indicate like elements with respect to FIG. 1, an optically compensated coupler sensor 90 implemented in accordance with the present invention is illustrated. Referring also to FIG. 8A, an operational diagram for the coupler sensor is depicted. In the optically compensated coupler sensor 90, encapsulating material 91 is both photoelastic and photorefractive such that the index of refraction of the material 91 varies in accordance with stress applied thereto and in accordance with illumination incident thereon. The stress sensitive coupler sensor, where the index of refraction of the encapsulating material varies only in accordance with stress applied thereto, is described in said U.S. Pat. No. 4,634,858. FIG. 8A illustrates the operational diagram of such a sensor where the waveforms $I_1$ and $I_2$ represent the variations of the coupling ratio as a function of the index of refraction, n, of the encapsulating material 91. Thus it is appreciated, that an input signal on the input fiber 12 is switched back and forth between the output fibers 14 and 15 as the index of refraction, n, is varied. The coupler sensor 90 operates such that a signal that is fully directed to the output fiber 14, with substantially no signal on the output fiber 15, smoothly shifts to the output fiber 15 until it is fully applied thereto as the index of refraction, n, varies. When the signal is fully applied to the output fiber 15, substantially no signal remains on the output fiber 14. Thus, the operational diagram of FIG. 8A illustrates the coupling ratio of the sensor 90 as a function of the index of refraction of the encapsulating material 91.

With continued reference to FIG. 8, the coupler sensor 90 includes a source 92 of static but adjustable optical bias. Light rays 93 diverge from the source 92 and are directed by a lens system 94 to illuminate the coupler joint region 11 as indicated by light rays 95. A variable current source 96 adjusts the level of optical bias 95.

As an illustration of the operation of the coupler sensor 90, assume that the sensor 90 is sensing a dynamic effect superimposed on a static background; for example, an A.C. electric field in the presence of a D.C. background field. When the D.C. static background field is zero, the parameters of the coupler sensor 90 can be selected so that the sensor is balanced and operates at point B of FIG. 8A. At point B, the sensor has maximum linear dynamic range and maximum sensitivity. Assume that a large increase in the D.C. background field biases the coupler sensor 90 to operate at point A of FIG. 8A. At point A, the coupler sensor 90 is at the limit of its operating range. Since the encapsulating material 91 is photorefractive, the operational bias of the coupler sensor 90 is returned to point B by adjusting the current source 96 to apply a compensation external optical bias from the source 92. Thus, the coupler sensor 90 may be continuously biased by the external light signal 95 to maintain the sensor 90 operating about the most linear splitting ratio thereof. The optical compensation extends the effective linear dynamic range of the sensor 90 many times beyond that provided without such compensation.

As described above, the coupling ratio may vary due to slight bending in the waist region. In this case, a coupler sensor which changes its ratio due to bending may be re-balanced either statically or dynamically by a photorefractive change in index.

The compensation technique described with respect to FIGS. 8 and 8A may also be applied in a feedback-nulling loop where the source 92 is maintained to null-out changes in coupler ratio bias. The external optical signal 95 is applied to maintain the photoelastic contribution of the ratio change nulled. The operation of the device may be maintained at point B of FIG. 8A. In this arrangement, a differential amplifying device (not shown) responsive to the output fibers 14 and 15 may be utilized to generate the control signal to drive the source 92. In this configuration, the error signal is tracked.

Figure 9:
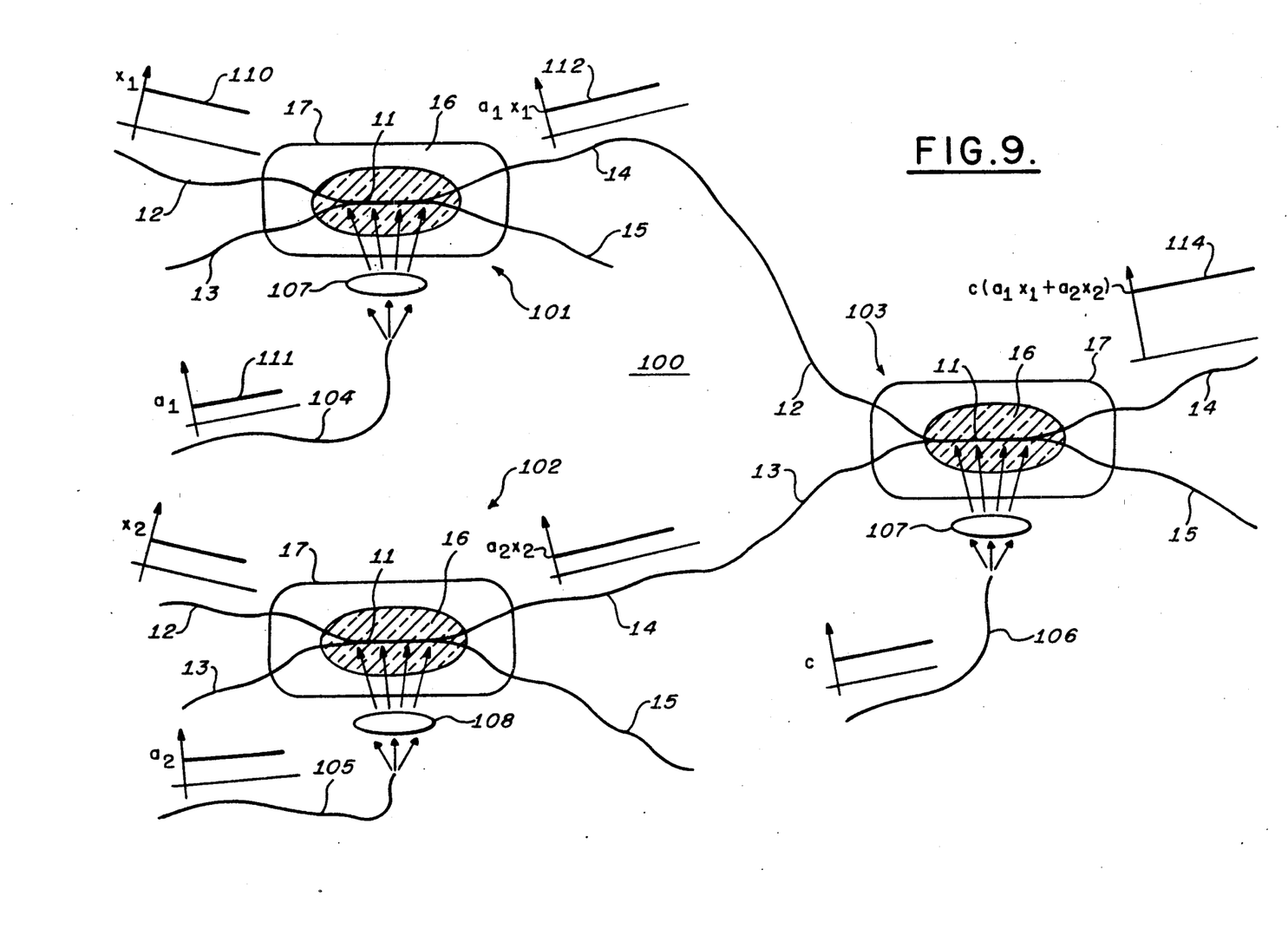
FIG. 9 is a schematic diagram of an optical weighted summing network implemented utilizing the element of FIG. 1.

Referring to FIG. 9, in which like reference numerals indicate like elements with respect to FIG. 1, an example of a combinational logic network 100 utilizing the optical signal processing element of the present invention is illustrated. The network 100 is comprised of logic elements 101, 102 and 103. The elements 101–103 include optical fibers 104–106 and lens systems 107–109 for illuminating the fusion joints 11 thereof, respectively. An optical signal 110 representative of a variable $x_1$ is applied to input fiber 12 of logic element 101. An optical signal 111 representative of a coefficient $a_1$ is applied to control fiber 104 of logic element 101. Because of the photorefractive operation of the element 101, as described above, an optical signal 112 representative of $a_1x_1$ appears on output fiber 14 of element 101. In a similar manner, logic element 102 forms the optical product $a_2x_2$ on output fiber 14 of element 102 in response to $x_2$ and $a_2$ applied to fibers 12 and 105 of element 102, respectively. The output fibers 14 of elements 101 and 102 are coupled, respectively, to input fibers 12 and 13 of element 103. Element 103 has an optical signal 113 representative of a coefficient c applied to control fiber 106 thereof. Thus, element 103 provides an optical signal 114 on the output fiber 14 thereof representative of $c(a_1x_1+a_2x_2)$. It is appreciated that the output fibers 14 and 15 of the element 101 or 102 can also be applied to the control fiber 106 of subsequent elements to perform logic and arithmetic operations as appropriate.

The fiber optic coupler elements described above may be considered as signal summing devices with two input and two output terminals. Since a ratio change occurs when the coupler is exposed to light, the output ratio thereof can be controlled in accordance with the magnitude of the illumination applied to the coupler. Thus, the element functions as a programmable weighted summing device and combinations of such elements can be utilized to provide various combinations of sums which could be weighted as desired by appropriate applied illumination. Because of the potentially high processing speed available in the optical domain, a network of optically programmed coupler elements may be utilized as a signal processor for the implementation of algorithms within the optical domain. Such a signal processing network could be utilized as a dedicated computing system, or as a programmable network for computing systems. Thus, optically programmable couplers can perform weighted sums similar to those utilized in digital algorithms such as power spectrum decomposition, matrix inversion, Eigenvalue solutions and the like. Because of the extremely high speed and low cost of such devices, very high speed, inexpensive switching networks may be constructed utilizing the elements described herein. For example, a network may be constructed to switch one of n input channels to one of m output channels. Switches implemented in accordance with the invention, are non-mechanical, solid-state, electro-optical devices that will function indefinitely being immune to wear out through repeated use.

The signal processing element of the present invention is a very inexpensive and simple device without moving parts, adaptable to mass-production techniques. Light energy applied to the encapsulating material modulates the output coupling ratio. The ratio changes may be static or dynamic and extremely fast compared to prior art elements for performing the same functions. The invention may be utilized in applications such as fiber optic cable television boosters, simple and low cost all-optical detectors and optically programmable variable ratio coupler sensors for fiber optic sensor systems. The photorefractive element of the present invention may be utilized in combination with the photoelastic fiber optic coupler sensor to form complex sensing and detecting systems Utilizing the present invention, signals encoded by light modulation intensity may be amplified and restored completely within the optical domain, or switched and routed to predetermined locations. Specifically, optical signals in fiber optic cables may periodically be boosted in signal intensity within the fibers without transforming the optical signals to the electrical domain. Many or all of the species of the invention described above, may be utilized in the same processing system where the configurations would function as building blocks to provide more complex optical processing.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A fiber optic signal processing element comprising a fiber optic coupler having a plurality of input optical fibers each having a core, said cores being coupled for exchange of optical signals in a waist region wherefrom a plurality of output optical fibers emerge, said fiber optic coupler distributing an input optical signal incident to one of said input optical fibers between said plurality of output optical fibers, photorefractive material, having a refractive index variable with an optical illumination signal applied thereto, encapsulating said waist region such that said input optical signal is distributed between said plurality of output optical fibers as a function of said optical illumination signal applied to said encapsulating material, signal means for providing said optical illumination signal to said photorefractive material such that said input optical signal is coupled substantially completely to a first one of said output optical fibers in response to a predetermined level of said optical illumination signal, said input optical signal being distributed between said first one of said output optical fibers and a second one of said output optical fibers in a ratio dependent on said optical illumination signal level relative to said predetermined level, and said input optical signal being coupled substantially completely to said second one of said output optical fibers in response to a preselected level of said optical illumination signal.

2. The element of claim 1 arranged to function as an option feedback oscillator wherein said input optical signal comprises a constant light level signal, and said signal means is said first one of said output optical fibers coupled to provide said optical illumination signal applied to said encapsulating material to vary said refractive index so as to direct light signals away from said first one of said output optical fibers to a second one of said output optical fibers until said optical illumination signal applied to said encapsulating material achieves a level whereat said refractive index is at a value that redirects light signals from said second one of said output optical fibers to said first one of said output optical fibers, and wherein said second one of said output optical fibers provides an output signal of said oscillator.

3. The element of claim 2 wherein said first one of said output optical fibers has a length and said oscillator output signal on said second one of said output optical fibers has a frequency corresponding to said length, said length of said first one of said output optical fibers being variable so as to vary said frequency.

4. The element of claim 3 functioning as a strain gauge further including means for varying said length of said first one of said output optical fibers in accordance with applied strain.

5. The element of claim 1 arranged to function as an optical correlator wherein said input optical signal comprises a signal to be correlated with an optical correlation signal, said optical illumination signal applied to said encapsulating material comprises said optical correlation signal, and said first one of said output optical fibers provided a correlator output signal indicative of correlation between said input optical signal and said optical correlation signal.

6. The element of claim 5 further including a source for providing said optical correlation signal, and bias means for biasing said source so as to provide a bias level of illumination to said encapsulating material so that when said input optical signal is coincident with said optical correlation signal said waist region, a constant output signal denoting correlation is provided at said first one of said output optical fibers.

7. The element of claim 6 wherein said source comprises an electrically actuated source of illumination driven by an electrical version of said optical correlation signal.

8. The element of claim 6 wherein said bias means provides a bias level of illumination so that said optical correlation signal coincident with said input optical signal at said waist region varies said refractive index so that said input optical signal is directed away from said first one of said output optical fibers to maintain said correlator output signal constant.

9. The element of claim 1 wherein said encapsulating material has a refractive index variable with said optical illumination signal applied thereto and variable with stress applied thereto such that said input optical signal is distributed between said plurality of output optical fibers as a function of said optical illumination signal and said stress applied to said encapsulating material.

10. The element of claim 9 further including a bias source for providing said optical illumination signal applied to said encapsulating material, said optical illumination signal having a controllable level, and means for controlling said level of said optical illumination signal so as to maintain a predetermined distribution of said input optical signal between said plurality of output optical fibers as said stress applied to said encapsulating material varies.

* * * * *